United States Patent
Nozu et al.

(10) Patent No.: US 8,030,901 B2
(45) Date of Patent: Oct. 4, 2011

(54) ELECTRIC ENERGY STORAGE DEVICE

(75) Inventors: Ryutaro Nozu, Midori-ku (JP);
Kunihiro Mitsuya, Chiba (JP)

(73) Assignee: Nisshinbo Holdings Inc., Tokyo (JP)

( * ) Notice: Subject to any disclaimer, the term of this patent is extended or adjusted under 35 U.S.C. 154(b) by 0 days.

(21) Appl. No.: 12/936,277

(22) PCT Filed: Apr. 15, 2009

(86) PCT No.: PCT/JP2009/057608
§ 371 (c)(1),
(2), (4) Date: Oct. 4, 2010

(87) PCT Pub. No.: WO2009/128482
PCT Pub. Date: Oct. 22, 2009

(65) Prior Publication Data
US 2011/0025275 A1 Feb. 3, 2011

(30) Foreign Application Priority Data

Apr. 16, 2008 (JP) .................................. 2008-107245
Apr. 16, 2008 (JP) .................................. 2008-107246

(51) Int. Cl.
*H02J 7/04* (2006.01)
*H02J 7/00* (2006.01)
(52) U.S. Cl. ......................... 320/139; 320/126; 320/167
(58) Field of Classification Search .................. 320/126, 320/139, 141, 145, 166, 167; 361/502
See application file for complete search history.

(56) References Cited

U.S. PATENT DOCUMENTS

| | | | |
|---|---|---|---|
| 6,998,822 B2 * | 2/2006 | Turner et al. | 320/166 |
| 7,417,407 B1 * | 8/2008 | Stuart et al. | 320/166 |
| 7,667,438 B2 * | 2/2010 | Ashtiani et al. | 320/167 |

FOREIGN PATENT DOCUMENTS

| | | |
|---|---|---|
| JP | A-2000-78768 | 3/2000 |
| JP | A-2002-246071 | 8/2002 |
| JP | A-2004-173345 | 6/2004 |
| JP | A-2006-210244 | 8/2006 |

OTHER PUBLICATIONS

Translation of International Preliminary Report on Patentability received Dec. 20, 2010 issued in International Patent Application No. PCT/JP2009/057608.
International Search Report mailed Jul. 14, 2009 issued in International Patent Application No. PCT/JP2009/057608 (with translation).

* cited by examiner

*Primary Examiner* — Richard V Muralidar
(74) *Attorney, Agent, or Firm* — Oliff & Berridge, PLC

(57) ABSTRACT

Provided is an electric energy storage device capable of improving a charging efficiency when electric power supplied with an input current having a current value repeatedly exhibiting peaks and valleys is to be storaged by using a secondary battery and an electric double-layer capacitor. The electric energy storage device includes: an electric double-layer capacitor; and a battery unit including at least one secondary battery, the battery unit being connected in parallel to the electric double-layer capacitor, in which: a ratio of an internal resistance of the electric double-layer capacitor to an internal resistance of the battery unit is determined according to parameters relating to the input current.

14 Claims, 8 Drawing Sheets

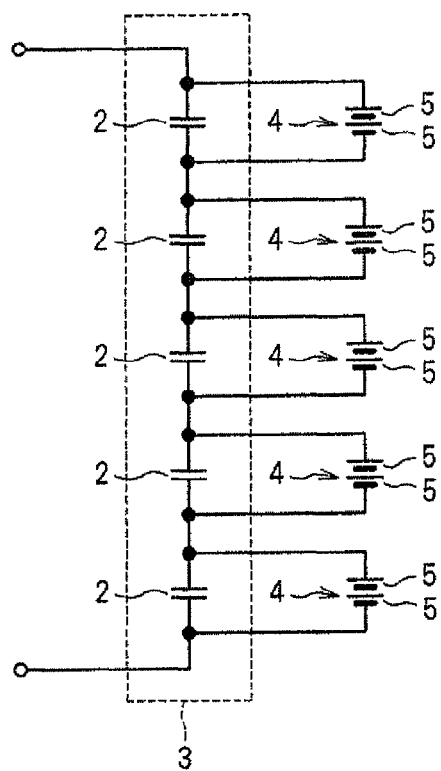
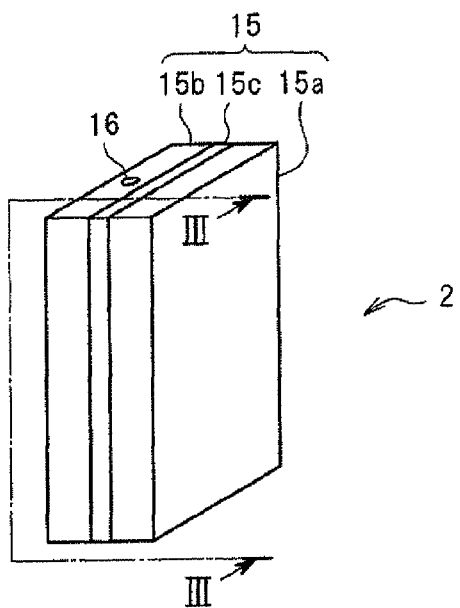

ELECTRIC ENERGY STORAGE DEVICE

TECHNICAL FIELD

The present invention relates to an electric energy storage device obtained by combining an electric double-layer capacitor and a secondary battery.

BACKGROUND ART

In recent years, as part of energy-saving measures, an electric-generating system using natural energy such as, for example, wind power or wave power, has attracted attention. Moreover, there has been increasing development of recovery systems for regenerative power obtained by drive of a moving body such as an automobile, a train, or a construction machine. In order to effectively use electric energy obtained by the aforementioned systems, an electric energy storage device for storing the electric energy therein is required. For such a purpose, various types of electric energy storage devices using a secondary battery or an electric double-layer capacitor have been proposed. For example, in Patent Literature 1, an electric energy storage device in which an electric double-layer capacitor is connected in parallel to a lithium secondary battery is proposed.

Prior Art Document

Patent Document
    Patent Literature 1: JP 2002-246071 A

DISCLOSURE OF THE INVENTION

Problems To Be Solved By The Invention

The electric power supplied from the electric-generating system using the natural energy, or from the recovery system for the regenerative power as described above, is not supplied stably over a long period of time, but may be input to the electric energy storage device with a current having a current value repeatedly exhibiting peaks and valleys. When the electric power supplied with the input current as described above is stored in the electric energy storage device including the secondary battery, the supplied electric power may not be stored sufficiently efficiently, particularly when a current having a large current value is input within a short period of time, because of a reaction speed of the secondary battery to the input current and other problems. On the other hand, the electric double-layer capacitor has a small internal resistance and high input/output characteristics compared with those of the secondary battery. Therefore, there is a possibility of improving charging efficiency of the whole electric energy storage device by connecting the electric double-layer capacitor in parallel to the secondary battery. Up to now, however, a combination of the electric double-layer capacitor and the secondary battery has not been fully examined in view of improvement of the charging efficiency.

Moreover, in the case where the electric power is to be stored in the electric energy storage device including the electric double-layer capacitor, an electric double-layer capacitor module including a plurality of the electric double-layer capacitors connected in series may be used when a voltage which can be applied to the single electric double-layer capacitor is less than an output voltage required for the whole electric energy storage device. When the electric double-layer capacitor module as described above is used as a part of the electric energy storage device, it is generally necessary to perform control so that the respective voltages of the electric double-layer capacitors become equal to each other at the time of charge/discharge. Without such control, a fluctuation is generated between the voltages due to individual differences of the electric double-layer capacitors, a usage environment, and other factors. As a result, a high voltage is disadvantageously applied to a specific one of the electric double-layer capacitors compared with the voltage applied to the other electric double-layer capacitor(s). If a higher voltage exceeding an allowable value is applied to the electric double-layer capacitor, a problem of a reduced lifetime or the like is induced. Thus, an equalization circuit for equalizing the respective voltages of the electric double-layer capacitors is generally connected to the electric double-layer capacitor module. The equalization circuit as described above may be a cause of increasing fabrication cost of the electric energy storage device or a factor preventing the electric energy storage device from being reduced in size.

The present invention has been made in view of the aforementioned circumstances, and has an object to provide an electric energy storage device capable of improving charging efficiency when electric power supplied with an input current having a current value repeatedly exhibiting peaks and valleys is to be stored by using a secondary battery and an electric double-layer capacitor.

Another object of the present invention is to provide an electric energy storage device which can eliminate need of an equalization circuit for equalizing voltages of a plurality of electric double-layer capacitors when electric power is to be stored by using a secondary battery and the plurality of electric double-layer capacitors.

Means for Solving the Problems

In order to solve the above-mentioned problems, in an aspect of the present invention, there is provided an electric energy storage device charged with an input current having a current value repeatedly exhibiting peaks and valleys, including: an electric double-layer capacitor unit including at least one electric double-layer capacitor; and a battery unit including at least one secondary battery, the battery unit being connected in parallel to the electric double-layer capacitor unit, in which a ratio of an internal resistance of the electric double-layer capacitor unit to an internal resistance of the battery unit is determined according to parameters relating to the input current.

In the above-mentioned electric energy storage device, the parameters relating to the input current may include a parameter relating to a change in the input current with time.

Further, the parameter relating to the change in the input current with time may include a time period during which a current having a predetermined threshold value or larger flows over one cycle including the peak and the valley of the current value.

In addition, the parameter relating to the change in the input current with time may include a time period during which a current less than a predetermined threshold value flows over one cycle including the peak and the valley of the current value.

Also, in the above-mentioned electric energy storage device, the ratio of the internal resistances may be determined so that a value of a product of the ratio of the internal resistances and a ratio of a chargeable electric energy of the electric double-layer capacitor unit to a chargeable electric energy of the battery unit is to be a value according to the parameters relating to the input current.

In the above-mentioned case, the value of the product is preferably equal to or larger than 0.018 and equal to or smaller than 0.036. Further, the value of the product is more preferably equal to or larger than 0.025 and equal to or smaller than 0.030.

In another aspect of the present invention, there is provided an electric energy storage device charged with an input current having a current value repeatedly exhibiting peaks and valleys, including: an electric double-layer capacitor unit including at least one electric double-layer capacitor; and a battery unit including at least one secondary battery, the battery unit being connected in parallel to the electric double-layer capacitor unit, in which a value of a product of a ratio of an internal resistance of the electric double-layer capacitor unit to an internal resistance of the battery unit, and a ratio of a chargeable electric energy of the electric double-layer capacitor to a chargeable electric energy of the battery unit, is equal to or larger than 0.018 and equal to or smaller than 0.036. Further, the value of the product is more preferably equal to or larger than 0.025 and equal to or smaller than 0.030.

In still another aspect of the present invention, there is provided an electric energy storage device including: a plurality of electric double-layer capacitors connected in series to each other; and a plurality of battery units respectively connected in parallel to the plurality of electric double-layer capacitors, each of the plurality of battery units including at least one sealed secondary battery for reducing oxygen, generated at a positive electrode, at a negative electrode when the at least one sealed secondary battery is overcharged, in which a rated voltage of each of the plurality of electric double-layer capacitors is equal to or higher than a voltage obtained when a corresponding one of the plurality of battery units, which is connected in parallel to the each electric double-layer capacitor, is overcharged.

In the above-mentioned electric energy storage device, each of the plurality of battery units is constituted by connecting a plurality of the secondary batteries in series.

Also, in the above-mentioned electric energy storage device, the secondary battery may be any one of a nickel-metal hydride battery, a nickel-cadmium battery, and a valve-regulated lead-acid battery.

BRIEF DESCRIPTION OF THE DRAWINGS

FIG. 1 is a circuit diagram illustrating an example of a circuit configuration of an electric energy storage device according to an embodiment of the present invention.

FIG. 2 is a perspective view illustrating an example of external appearance of an electric double-layer capacitor.

BEST MODE FOR CARRYING OUT THE INVENTION

Figure 3:
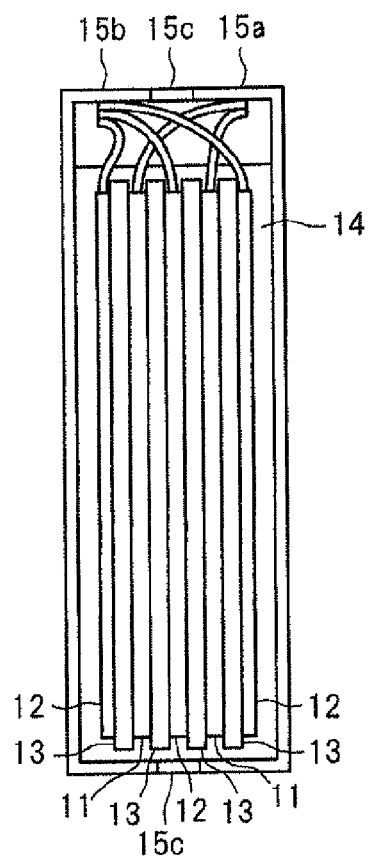
FIG. 3 is a sectional view illustrating an example of an internal structure of the electric double-layer capacitor.

Hereinafter, embodiments of the present invention are described referring to the drawings.

First Embodiment

FIG. 1 is a circuit diagram illustrating a circuit configuration of an electric energy storage device 1 according to a first embodiment of the present invention. The electric energy storage device 1 according to this embodiment is a device for accumulating externally supplied electric energy such as, for example, electric power obtained by wind power generation or the like, or regenerative electric power obtained by drive of an automobile or the like, in an electric double-layer capacitor and a secondary battery.

The electric energy storage device 1 includes, as illustrated in FIG. 1, an electric double-layer capacitor module 3 including a plurality of electric double-layer capacitors 2, and battery units 4 which are the same in number as the electric double-layer capacitors 2. Each of the battery units 4 includes one or a plurality of secondary batteries 5. By using the electric double-layer capacitors 2 and the secondary batteries 5 at the same time in this manner, a high output-performance characteristic of the electric double-layer capacitors 2 compared with that of the secondary batteries 5, and a high energy-density characteristic of the secondary batteries 5 compared with that of the electric double-layer capacitors 2, can be used complementarily.

As illustrated in FIG. 1, the electric double-layer capacitor module 3 includes the plurality of electric double-layer capacitors 2 connected in series. Each of the electric double-layer capacitors 2 included in the electric double-layer capacitor module 3 has the same structure.

FIG. 2 is a perspective view illustrating an example of external appearance of each of the electric double-layer capacitors 2. FIG. 3 is a sectional view illustrating an example of an internal structure of each of the electric double-layer capacitors 2. As illustrated in the aforementioned figures, each of the electric double-layer capacitors 2 includes at least one pair of a positive electrode 11 and a negative electrode 12, a separator 13 provided between the electrodes so that the electrodes are not brought into contact with each other, an organic electrolyte 14 impregnating each of the electrodes and the separator 13, and a case 15.

Each of the positive electrode 11 and the negative electrode 12 is a polarizable electrode, and is formed of, for example, a metal collector foil. Further, a layer made of a composition containing an electrode active material which is a high surface area material such as activated carbon, a conductive material, and a binder is formed for at least one of the positive electrode 11 and the negative electrode 12. Specifically, the composition layer is formed, for example, by applying a slurry of the composition onto one or both of surfaces of the collector foil, drying, and then rolling the slurry of the composition.

The separator 13 is a sheet-like member which is larger than an area where the positive electrode 11 and the negative electrode 12 overlap, and is formed of an insulating material such as, for example, glass fiber, polyolefin, polyamide-imide, polyester, a fluororesin, and a cellulosic material. The positive electrode 11 and the negative electrode 12 are separated from each other by the separator 13 so as not to be brought into electrical contact with each other.

The organic electrolyte 14 is a composition containing a non-aqueous organic solvent and an electrolyte. The electrolyte may be, for example, a salt composed of quaternary onium cations such as quaternary ammonium cations or quaternary phosphonium cations and anions such as $BF_4^-$, $PF_6^-$, $ClO_4^-$, $CF_3SO_3^-$, $(CF_3SO_2)_2N^-$, or $CF_3CO_2^-$. When the electrolyte is an ionic liquid, the organic electrolyte 14 may be an electrolyte consisting of the ionic liquid alone. By impregnating the positive electrode 11 and the negative electrode 12 with the organic electrolyte 14, electric charges are charged on surfaces of the positive electrode 11 and the negative electrode 12 according to the external application of a voltage so that each of the electric double-layer capacitors 2 functions as an electricity storage device.

The case 15 is a container for housing the positive electrode 11, the negative electrode 12, the separator 13, and the organic electrolyte 14 therein, and has a shape such as, for example, a flat plate-like shape, a rectangular parallelepiped shape, or a cylindrical shape. A positive electrode terminal and a negative electrode terminal are provided on an outer surface of the case 15. The positive electrode terminal is electrically connected to the positive electrode 11 inside the case 15, whereas the negative electrode terminal is electrically connected to the negative electrode 12 inside the case 15. The electric double-layer capacitor 2 is electrically connected to other components constituting the electric energy storage device 1 through intermediation of each of the electrode terminals.

In the example illustrated in FIG. 2, the case 15 has an approximately rectangular shape viewed from the side, and includes a pair of metal bodies 15a and 15b and an insulator 15c. One of the pair of metal bodies (supposing the metal body 15a in this case) functions as the positive electrode terminal, whereas the other one (supposing the metal body 15b in this case) functions as the negative electrode terminal. In this example, a surface of the metal body 15a on the inner side of the case 15 is connected to the positive electrode 11, whereas a surface of the metal body 15b on the inner side of the case 15 is connected to the negative electrode 12. Moreover, with the insulator 15c, the metal bodies 15a and 15b are arranged so as not to be brought into direct contact with each other. As a result, an electrode terminal projecting from the case 15 is not required to be additionally provided. Therefore, space for the whole electric energy storage device 1 can be saved. An exhaust hole 16 for exhausting a gas when an internal pressure of the case 15 is increased is provided on the case 15.

Each of the battery units 4 includes one or a plurality of the secondary batteries 5. As illustrated in FIG. 1, the battery units 4 are connected in parallel to the plurality of electric double-layer capacitors 2, respectively. Specifically, a plurality of sets, each including the electric double-layer capacitor 2 and the battery unit 4 which are connected in parallel to each other, are connected in series.

Figure 4:
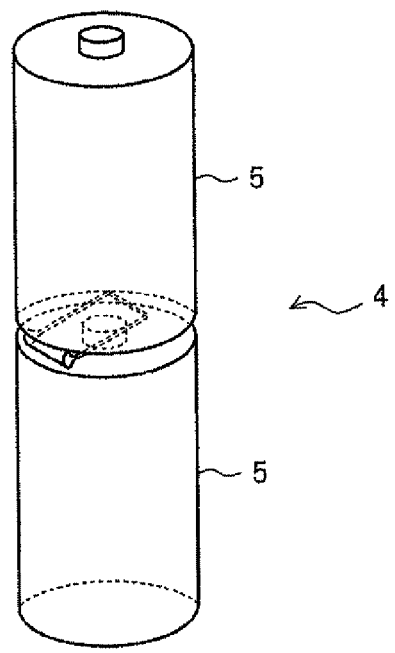
FIG. 4 is a perspective view illustrating an example of external appearance of a battery unit.
Figure 5A:
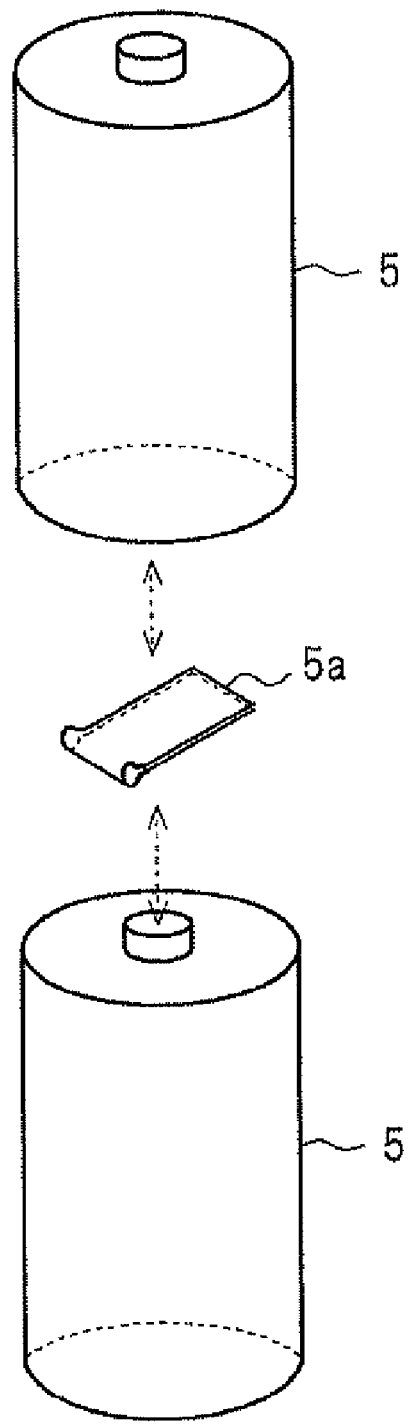
FIG. 5A is an exploded perspective view illustrating an example of a structure of the battery unit.
Figure 5B:
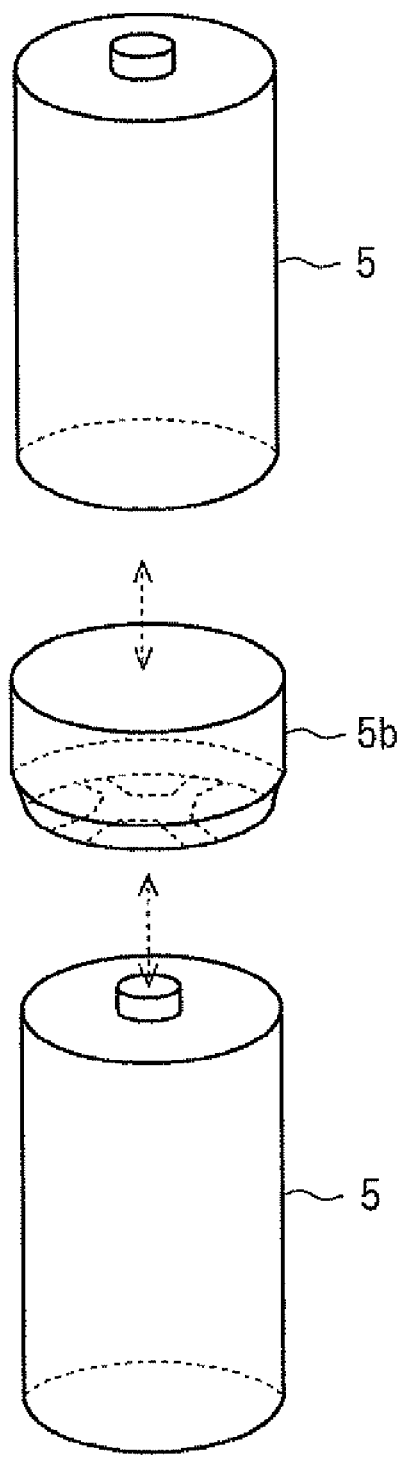
FIG. 5B is an exploded perspective view illustrating another example of the structure of the battery unit.

FIG. 4 is a perspective view illustrating an example of external appearance of the battery unit 4. Here, the battery unit 4 includes two secondary batteries 5 connected in series to each other. Each of the secondary batteries 5 has a cylindrical shape and is of the same type. FIG. 5A is an exploded perspective view for illustrating a structure of the battery unit 4 illustrated in FIG. 4. As illustrated in the figure, the battery unit 4 is formed by welding the two secondary batteries 5 to a single metal plate 5a. In this case, the battery unit 4 is fabricated by welding the positive electrode of one of the secondary batteries 5 and the negative electrode of the other secondary battery 5 respectively to two ends of one of surfaces of the band-like metal plate 5a and then bending the metal plate 5a. As a result, the two secondary batteries 5 are electrically connected in series to each other and are physically vertically arranged. However, a method of connecting the secondary batteries 5 is not limited thereto. For example, as illustrated in FIG. 5B, a metal material 5b in a cylindrical shape having an inner diameter according to a diameter of each of the secondary batteries 5, which is provided with a plurality of portions projecting from a circumferential end on one side toward the inner side of the cylinder, may be used for connecting the two secondary batteries 5. By connecting the two secondary batteries 5 through intermediation of the metal material 5b as described above, electric resistance between the two secondary batteries 5 can be reduced.

Figure 6:
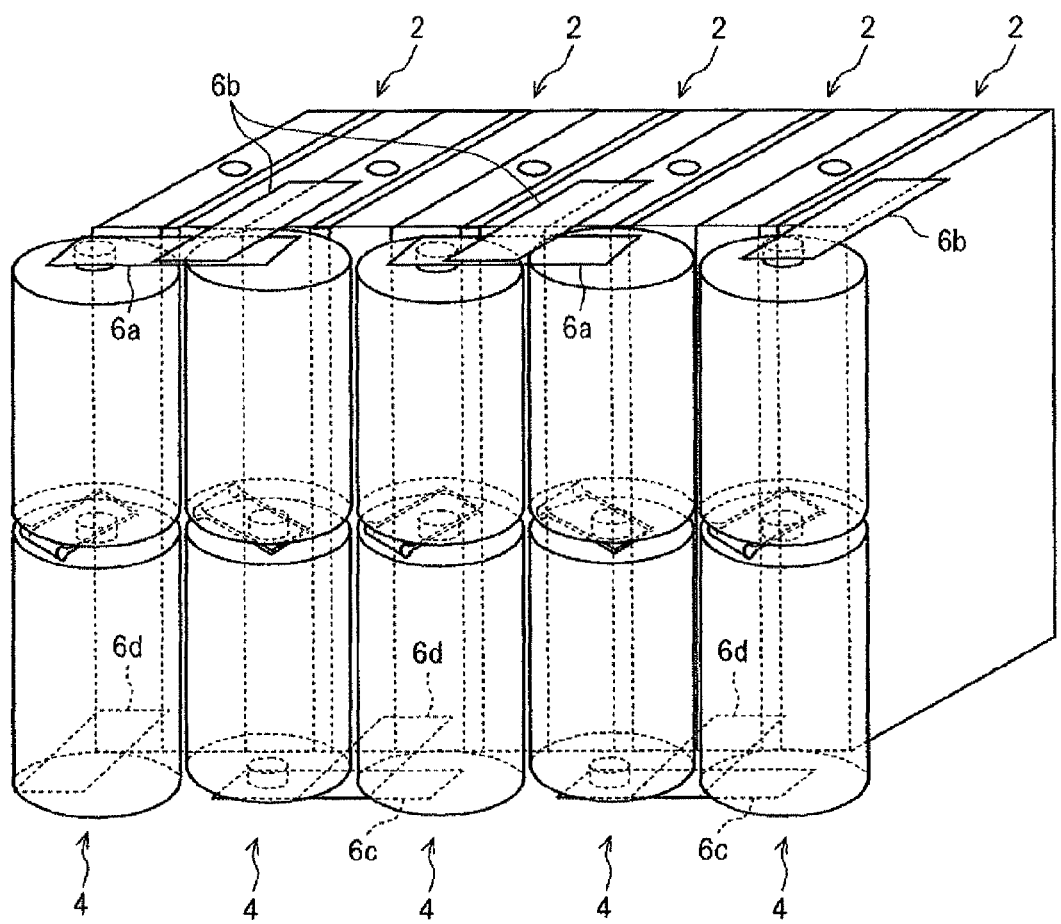
FIG. 6 is a perspective view illustrating an exemplary arrangement of the electric double-layer capacitors and the battery units.

A specific example of the physical arrangement of the electric double-layer capacitors 2 and the battery units 4 in the case where the electric double-layer capacitors 2 exemplified in FIG. 2 and the battery units 4 exemplified in FIG. 4 are used is now described. FIG. 6 is a perspective view illustrating an example of the arrangement of the electric double-layer capacitors 2 and the battery units 4 inside the electric energy storage device 1. In the example illustrated in this figure, the electric energy storage device 1 includes five electric double-layer capacitors 2 and five battery units 4, each battery unit including two secondary batteries 5.

As illustrated in FIG. 6, an edge portion of each of the plurality of electric double-layer capacitors 2 is welded so that the metal body 15a which constitutes a part of the case 15 is connected to the metal body 15b of the electric double-layer capacitor 2 adjacent thereto. The edge portion is also welded so that the metal body 15b is connected to the metal body 15a of the electric double-layer capacitor 2 adjacent thereto on the opposite side. As described above, the metal bodies 15a and 15b of each of the electric double-layer capacitors 2 function as the positive electrode terminal and the negative electrode terminal, respectively. Therefore, by arranging the plurality of electric double-layer capacitors 2 so as to be in contact with each other, the positive electrode of each of the electric double-layer capacitors 2 is electrically connected to the negative electrode of the electric double-layer capacitor 2 adjacent thereto. As a result, the plurality of electric double-layer capacitors 2 are connected in series to each other.

Further, the battery unit 4 to be connected in parallel to each electric double-layer capacitor 2 is arranged so as to be adjacent to each of the electric double-layer capacitors 2. In this case, a diameter of each of the secondary batteries 5 constituting each of the battery units 4 has a value corresponding to a thickness of each of the electric double-layer capacitors 2. Moreover, a height of each of the battery units 4 has a value corresponding to a height of each of the electric double-layer capacitors 2 (a length of a long side of the rectangular shape as viewed from the side).

The battery units 4 are alternately arranged so that the vertical orientation of one of the battery units 4 is opposite to that of the battery unit 4 adjacent thereto. Further, it is assumed that one of the battery units 4, which has the positive electrode on the upper side in the drawing, is a battery unit of interest. Then, the positive electrode of the battery unit of interest is connected to the negative electrode of the battery unit 4 adjacent to the battery unit of interest on the right side in the drawing through an intermediation of a metal plate 6a having an approximately rectangular shape. The metal plate 6a is connected to the metal body 15a of the electric double-layer capacitor 2 to be connected in parallel to the battery unit of interest and the metal body 15b of the electric double-layer capacitor 2 provided adjacent to the aforementioned electric double-layer capacitor 2 on the right side through intermediation of a metal plate 6b having an approximately rectangular shape.

The negative electrode of the battery unit of interest is connected to the positive electrode of the battery unit 4 adjacent to the battery unit of interest on the left side in the drawing through intermediation of a metal plate 6c having approximately the same shape as that of the metal plate 6a. The metal plate 6c is connected to the metal body 15b of the electric double-layer capacitor 2 to be connected in parallel to the battery unit of interest and to the metal body 15a of the electric double-layer capacitor 2 provided adjacent to the aforementioned electric double-layer capacitor 2 on the left side through intermediation of a metal plate 6d having approximately the same shape as that of the metal plate 6b. In this manner, the plurality of battery units 4 are connected in series to each other, and each of the battery units 4 is connected in parallel to the electric double-layer capacitor 2 adjacent thereto.

According to the aforementioned structure, the electric double-layer capacitors 2 and the battery units 4 are arranged in rows so that a gap therebetween is reduced. In addition, the terminals of the electric double-layer capacitors 2 or the like can be prevented from projecting. Thus, the overall size of the electric energy storage device 1 can be reduced.

Next, characteristics of the electric double-layer capacitors 2 and the battery units 4 constituting the electric energy storage device 1 in this embodiment are described.

In this embodiment, each of the secondary batteries 5 constituting the battery unit 4 is a sealed secondary battery and has a property of generating a reaction of reducing oxygen, which is generated at the positive electrode, at the negative electrode when being overcharged. Herein, "overcharge" means a state where electric energy is still supplied to the battery unit 4 even after the secondary batteries 5 constituting the battery unit 4 are fully charged. The reaction as described above occurs in the sealed secondary battery using an aqueous solution as the electrolyte. As specific examples of the secondary battery 5 described above, for example, a nickel-metal hydride battery, a nickel-cadmium battery, a valve-regulated lead-acid battery (sealed lead-acid battery), and the like are given.

Hereinafter, taking the nickel-metal hydride battery as an example, the properties of each of the sealed secondary batteries 5 for reducing oxygen, which is generated at the positive electrode, at the negative electrode when the secondary battery is overcharged are described. When the electric power is externally supplied to the nickel-metal hydride battery, the following reactions (hereinafter, referred to as charge reactions) occur respectively at the positive electrode (nickel hydroxide) and the negative electrode (a hydrogen-absorbing alloy; for example, misch metal nickel-five).

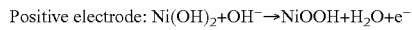

Positive electrode: $Ni(OH)_2 + OH^- \rightarrow NiOOH + H_2O + e^-$

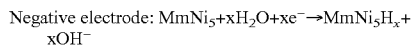

Negative electrode: $MmNi_5 + xH_2O + xe^- \rightarrow MmNi_5H_x + xOH^-$

By the charge reactions described above, the externally supplied electric energy is storaged in each of the secondary batteries 5.

When the charge reactions progress, reactions as follows (hereinafter, referred to as side reactions) start occurring in each of the secondary batteries 5 in addition to the charge reactions described above.

Positive electrode: $2OH^- \rightarrow 1/2 O_2 + H_2O + 2e^-$

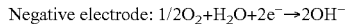

Negative electrode: $1/2 O_2 + H_2O + 2e^- \rightarrow 2OH^-$

Then, when each of the secondary batteries 5 is brought into an overcharged state, the charge reactions no longer occur and only the side reactions occur.

As a result of the side reactions, oxygen is generated at the positive electrode, whereas the thus generated oxygen is absorbed and reduced at the negative electrode. In this embodiment, the secondary batteries 5 are of sealed type. Therefore, oxygen generated at the positive electrode is not released to the outside each of the secondary batteries 5 but is used for the reaction occurring at the negative electrode. Therefore, the side reactions in the overcharged state progress without being particularly restricted as long as the electric power is externally supplied. As a result, even if the electric power is continuously externally supplied in the overcharged state, a voltage of each of the secondary batteries 5 is kept to an approximately constant value without being continuously increased. Moreover, the amount of electrolyte is not substantially reduced by the side reactions because the amount of water which is electrolyzed in the secondary battery 5 and the amount of water generated by oxygen reduction are equal to each other. Thus, the battery is not deteriorated by the overcharge.

Figure 7:
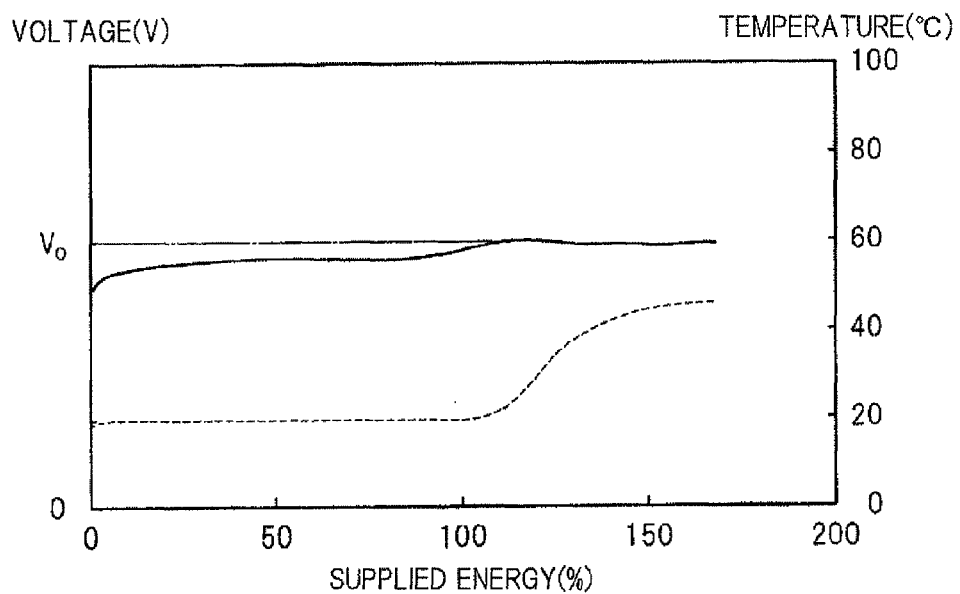
FIG. 7 is a graph for illustrating properties of a secondary battery used for the electric energy storage device according to the embodiment of the present invention.

FIG. 7 is a graph showing the properties of the battery unit 4 including the nickel-metal hydride batteries as described above. In this graph, a horizontal axis indicates an electric energy (supplied energy) amount (in J) externally supplied to the battery unit 4 in a ratio (in %) to energy chargeable in the battery unit 4. A left vertical axis in the drawing sheet indicates a voltage (in V) between the positive electrode and the negative electrode of the battery unit 4, whereas a right vertical axis in the drawing sheet indicates a temperature (in degrees Celsius) of the battery unit 4. In the graph, a change in voltage according to the supplied energy is indicated by a solid line, whereas a change in temperature is indicated by a broken line. As illustrated in the graph, when the battery unit 4 becomes into the overcharged state (specifically, in a state where a value on the horizontal axis exceeds 100%), the voltage of the battery unit 4 is slightly increased compared with that before the battery unit 4 is overcharged, and is then kept to an approximately constant value without being increased any more. Instead, it is shown that the externally supplied electric energy is converted into thermal energy by a chemical reaction, which increases the temperature of the battery unit 4. Hereinafter, the voltage of the battery unit 4 when the battery unit is overcharged is denoted as an overcharge voltage $V_o$.

Further, in this embodiment, a rated voltage $V_r$ of each of the electric double-layer capacitors 2 is equal to or higher than the overcharge voltage $V_o$ of the battery unit 4 connected in parallel to the each electric double-layer capacitor 2. Here, the rated voltage $V_r$ is an upper limit voltage which is allowed to be applied to each of the electric double-layer capacitors 2 in a predetermined environment where the electric energy storage device 1 is used. For using the electric energy storage device 1, the value of the voltage applied to each of the electric double-layer capacitors 2 is requested not to exceed the rated voltage $V_r$. The rated voltage $V_r$ may be, for example, a value of a rated voltage which is disclosed by a manufacturer of the electric double-layer capacitors 2, or may also be a voltage upper limit value appropriate to the electric energy storage device 1, which is determined based on circuit design requests, assumed usage environment, or the like.

As a specific example, the type, the number, and a mode of connection of the batteries constituting the battery unit 4 are determined according to the rated voltage $V_r$ of each of the electric double-layer capacitors 2 so that the overcharge voltage $V_o$ of the battery unit 4 does not exceed the rated voltage $V_r$. In the case where the nickel-metal hydride battery having the voltage value of about 1.6V when being overcharged is used as each of the secondary batteries 5 constituting the battery unit 4, the overcharge voltage $V_o$ of the battery unit 4 is about 3.2V when the battery unit 4 has the configuration in which the two secondary batteries 5 are connected in series as illustrated in FIG. 4. Therefore, the electric double-layer capacitors 2, each having the rated voltage $V_r$ of 3.2V or higher, are to be used for the electric energy storage device 1.

In the case where a relation (rated voltage $V_r$)≧(overcharge voltage $V_o$) is satisfied by the electric double-layer capacitor 2 and the battery unit 4 connected in parallel to each other, the voltage applied to each of the electric double-layer capacitors 2 constituting the electric double-layer capacitor module 3 is controlled so as not to exceed the rated voltage $V_r$ even if the electric energy exceeding a storageable energy of the electric energy storage device 1 is externally supplied. This is because the upper limit of the voltage applied to each of the electric double-layer capacitors 2 is reduced to the overcharge voltage $V_o$ by the side reactions occurring in each of the secondary batteries 5 included in the battery unit 4 connected in parallel to each of the electric double-layer capacitors 2. Hence, according to the electric energy storage device 1 of this embodiment, it is no longer necessary to additionally connect an equalization circuit for controlling the voltage to be applied to each of the electric double-layer capacitors 2.

In the above description, the reactions have been described taking the case where each of the secondary batteries 5 is the nickel-metal hydride battery as an example. However, other types of batteries may be used as long as the battery causes the reaction for reducing oxygen that oxygen is generated on the positive electrode and is reduced on the negative electrode when the secondary battery is overcharged. Moreover, although the battery unit 4 has the configuration in which the two secondary batteries 5 are connected in series in the above description, the configuration of the battery unit 4 is not limited thereto. In particular, the number of the secondary batteries 5 to be included in the battery unit 4 may be, for example, one, or three or larger according to the relation between the rated voltage $V_r$ of the electric double-layer capacitor 2 and the overcharge voltage $V_o$ of each of the secondary batteries 5.

Second Embodiment

Figure 8:
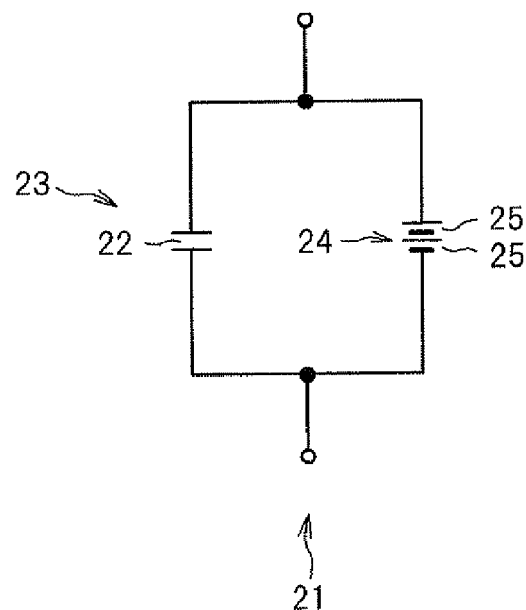
FIG. 8 is a circuit diagram illustrating an example of a circuit configuration of an electric energy storage device according to a second embodiment of the present invention.

Next, an electric energy storage device according to a second embodiment of the present invention is described. The electric energy storage device according to this embodiment is also a device for accumulating electric power obtained by wind power generation or the like, or regenerative electric power obtained by drive of an automobile or the like as in the case of the electric energy storage device according to the first embodiment, and includes an electric double-layer capacitor unit including at least one electric double-layer capacitor, and a battery unit connected in parallel to the electric double-layer capacitor, the battery unit including at least one secondary battery. FIG. 8 is a diagram illustrating an example of a circuit configuration of an electric energy storage device 21 according to this embodiment. An electric double-layer capacitor unit 23 includes one or a plurality of electric double-layer capacitor cells 22, whereas a battery unit 24 includes one or a plurality of secondary batteries 25. The electric double-layer capacitor cell 22 may be an electric double-layer capacitor having the same configuration as that of the electric double-layer capacitor 2 described in the first embodiment. Each of the secondary batteries 25 may be a sealed battery such as a nickel-metal hydride battery, a nickel-cadmium battery, or a valve-regulated lead-acid battery (sealed lead-acid battery) as in the case of each of the secondary batteries 5 described in the first embodiment. Further, the battery unit 24 may have the same configuration as, or a different configuration than, that of the battery unit 4 described in the first embodiment.

In this embodiment, electrical characteristics of the components constituting the electric energy storage device 21 are determined according to the characteristics of the externally supplied electric energy. Specifically, it is assumed that the electric energy storage device 21 according to this embodiment is charged with, for example, electric power generated by wind power generation, wave power generation, or the like, or regenerative power obtained by the drive of an automobile or the like. In this case, the externally supplied electric power is input to the electric energy storage device 21 not in the form of a current having a constant current value over a long period of time but in the form of an intermittently changing current. Specifically, an input current $I_t$ externally supplied to the electric energy storage device 21 has a characteristic that a current value thereof repeatedly exhibits peaks and valleys with elapse of time while the energy stored in the electric energy storage device 21 reaches a predetermined target value from zero. More specifically, the input current $I_t$ repeatedly exhibits the peaks and valleys in a cycle of, for example, several seconds to about 10 minutes.

When the electric energy externally supplied with the input current $I_t$ repeatedly exhibiting the peaks and valleys as described above is to be storaged in the electric energy storage device using the secondary batteries 25 alone, the input current $I_t$ having a large current value exceeding an average value of the input current $I_t$, which is obtained over a period of time during which charging is performed, momentarily flows into the secondary batteries 25 at some time even if the average value is a value providing desirable conditions according to the characteristics of the secondary batteries 25. At such a time, each of the secondary batteries 25 cannot efficiently progress the charge reactions described above due to characteristics such as reaction speed. As a result, a charging efficiency of the electric energy storage device (a ratio of energy which is not consumed inside but is storaged in the electric energy storage device to the externally supplied electric energy) may be lowered. Therefore, in this embodiment, the electric double-layer capacitor unit 23 is connected in parallel to the battery unit 24 including the secondary batteries 25. As a result, the input current $I_t$ is distributed to flow into the battery unit 24 and the electric double-layer capacitor unit 23 so that the current flowing into the battery unit 24 is leveled by the electric double-layer capacitor unit 23. Thus, a maximum value of the current flowing into the battery unit 24 can be reduced to improve the charging efficiency of each of the secondary batteries 25.

Figure 9:
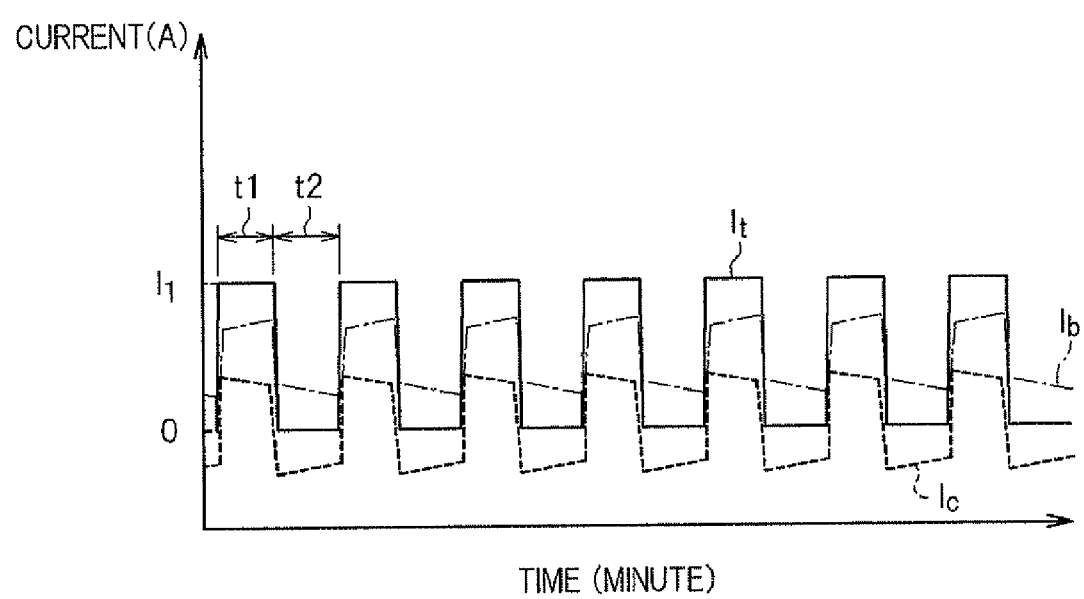
FIG. 9 is a graph showing an example of a relation between an input current, and currents flowing into an electric double-layer capacitor and a battery unit.

FIG. 9 is a graph showing an example of a relation among the input current $I_t$ input to the electric energy storage device 21 at the time of charge, a current $I_c$ flowing into the electric double-layer capacitor unit 23, and a current $I_b$ flowing into the battery unit 24 connected in parallel to the electric double-layer capacitor unit 23. In FIG. 9, a horizontal axis indicates a time (in minutes), whereas a vertical axis indicates a current (in A). Moreover, in the graph, a current value of the input current $I_t$ is indicated by a solid line, a current value of the current $I_c$ flowing into the electric double-layer capacitor unit 23 is indicated by a broken line, and a current value of the current $I_b$ flowing into the battery unit 24 is indicated by an alternate long and short dash line. In the example shown in the graph, the input current $I_t$ is a pulse current with a square wave having a current value of $I_1$ during a time period t1 and a current value of 0 during a following time period t2, the square wave being repeated in a cycle of (t1+t2).

In this case, while the current value of the input current $I_t$ is $I_1$ (during the time period t1), the input current $I_t$ is distributed to be supplied to the electric double-layer capacitor unit 23 and the battery unit 24. Therefore, the current $I_b$ having a smaller current value than $I_1$ flows into the battery unit 24. Moreover, compared with the secondary battery 25, charge/discharge at a high speed is possible for the electric double-layer capacitor unit 23. Thus, the electric double-layer capacitor unit 23 is quickly charged so as to have a higher voltage than that of the battery unit 24. Accordingly, while the current value of the input current $I_t$ is zero (during the time period t2), the electric power is discharged from the electric double-layer capacitor unit 23 to the battery unit 24. As a result, during the time period t2, the current $I_c$ flowing into the electric double-layer capacitor unit 23 has a negative value (flows in a direction opposite to that during the time period t1) and the current $I_b$ having the same amount as the current $I_c$ flows into the battery unit 24. As a result, the battery unit 24 is continuously charged. In this way, the current $I_b$ flowing into the battery unit 24 becomes a current exhibiting more moderate fluctuations than the peaks and valleys of the current value of the input current $I_t$. Accordingly, the charging efficiency can be prevented from being degraded due to the flow of an excessively large current into the secondary batteries 25.

In the example described above, the distribution of the input current $I_t$ to be supplied to the electric double-layer capacitor unit 23 and the battery unit 24 is determined according to a ratio of an internal resistance $R_c$ of the electric double-layer capacitor unit 23 to an internal resistance $R_b$ of the battery unit 24. Therefore, in the electric energy storage device 21 according to this embodiment, when the electric energy storage device is charged with the input current $I_t$ having the current value repeatedly exhibiting the peaks and valleys, the ratio of the internal resistance $R_c$ of the electric double-layer capacitor unit 23 to the internal resistance $R_b$ of the battery unit 24 is determined according to parameters relating to the input current $I_t$ so that the charging efficiency can be improved.

The charging efficiency of the electric energy storage device 21 according to this embodiment is degraded not only due to the electric energy consumed by the internal resistance $R_c$ of the electric double-layer capacitor unit 23 and the internal resistance $R_b$ of the battery unit 24 but also due to the increase in electric energy consumed by the side reactions (chemical reactions which do not contribute to charge) occurring in each of the secondary batteries 25. Therefore, in this embodiment, the ratio of the internal resistance $R_c$ of the electric double-layer capacitor unit 23 to the internal resistance $R_b$ of the battery unit 24 (hereinafter, referred to as an internal resistance ratio) is determined so that a rate of the reaction speed of the charge reactions to the reaction speed of the side reactions (hereinafter, referred to as a reaction rate k) in each of the secondary batteries 25 constituting the battery unit 24 becomes high. Here, the reaction rate k indicates a likelihood of occurrence of the charge reactions with respect to all reactions occurring in the battery unit 24. By increasing the reaction rate k, the ratio of occurrence of the charge reactions during the charge becomes high compared with that of the side reactions. As a result, the charging efficiency of the electric energy storage device 21 can be enhanced.

More specifically, for example, a relation between the reaction rate k (in %) and the internal resistance ratio ($R_c/R_b$) is modeled by a relational expression below. The relational expression is obtained by introducing the internal resistance ratio and the parameters relating to the input current $I_t$ as factors relating to a stress other than a temperature into the Eyring equation for the reaction speed.

[Expression 1]

$$k = A\exp\left(-\frac{B}{T}\right) \cdot \left\{\frac{I1 \cdot (Rc/Rb)}{1+(Rc/Rb)}\right\}^\alpha \cdot (SOC)^\beta \cdot (t1)^\gamma \cdot (t2)^\omega \quad (1)$$

In the expression, each of t1 and t2 is one of the parameters relating to the change in the input current $I_t$ with time, t1 is a time period during which the current having a predetermined current value flows, and t2 is a time period subsequent to the time period t1, during which the current does not flow, each time period being indicated in seconds. Moreover, $I_1$ is one of the parameters relating to the magnitude of the input current $I_t$ and indicates a current value (in A) of the input current $I_t$ during the time period t1. Changes in values of the parameters cause a change in the reaction rate k.

In Expression (1), T is a temperature (in degrees) of the battery unit 24, and SOC is a ratio of a target charge amount with respect to a chargeable electric capacity of the entire battery unit 4, specifically, a state of charge (in %). A value according to the environment where the electric energy storage device 21 is assumed to be used is suitably used as the temperature T. The state of charge SOC is determined according to the purpose of use of the electric energy storage device 21 or the necessary electric energy. For example, in the case where it is assumed that the electric energy storage device 21 is charged until the state of charge SOC of the battery unit 24 becomes 80% for use, the value 80 is used as the value of the state of charge SOC. As a result, the reaction rate k when the electric energy storage device 21 in an empty state is charged to the state of charge of 80% can be calculated according to Expression (1).

Further, in Expression (1), A, B, $\alpha$, $\beta$, $\gamma$, and $\omega$ are predetermined constants and are determined according to the type of the secondary batteries 25 constituting the battery unit 24, the electric double-layer capacitor cell 22 constituting the electric double-layer capacitor unit 23, or the like. The aforementioned constants can be determined by, for example, inputting the input current $I_t$ determined by a specific parameter into a test circuit and measuring the reaction rate k.

By using Expression (1) described above, the reaction rate k, which is an index associated with the charging efficiency of the electric energy storage device 21, can be calculated by using the parameters ($I_1$, t1, and t2 in this case) relating to the input current $I_t$ which is assumed to be input for the actual use of the electric energy storage device 21. Here, it is necessary to take various conditions in addition to the charging efficiency into consideration in terms of circuit design. For example, if the capacity of the electric double-layer capacitor unit 23, which is connected in parallel to the battery unit 24, is increased, the input current $I_t$ can be further leveled to improve the charging efficiency. On the other hand, however, an energy density of the electric double-layer capacitor cell 22 is generally smaller than that of each of the secondary batteries 25. Therefore, if the capacity of the electric double-layer capacitor unit 23 is increased, the energy density of the whole electric energy storage device 21 is lowered. Accordingly, the internal resistance ratio ($R_c/R_b$) which satisfies the condition that, for example, the reaction rate k becomes the predetermined value or larger, is determined by using Expression (1). A circuit configuration of the electric energy storage device 21 is determined so that other conditions relating to the energy density and the like are also satisfied while the condition of the internal resistance ratio ($R_c/R_b$) determined by using Expression (1) is satisfied. Alternatively, when the amount of increase in the reaction rate k with respect to the amount of change in the internal resistance ratio ($R_c/R_b$) calculated by Expression (1) becomes a predetermined value or less, the capacity of the electric double-layer capacitor unit 23 may be determined so as not to be increased any more.

Further, by introducing a parameter in consideration of both the aforementioned internal resistance ratio ($R_c/R_b$) and a ratio of a chargeable electric energy $W_c$ in the electric double-layer capacitor unit 23 to a chargeable electric energy $W_b$ in the battery unit 24 (hereinafter, referred to as a chargeable electric energy ratio) and using the electric double-layer capacitor unit 23 and the battery unit 24 which satisfy conditions relating to the aforementioned parameter, the charging efficiency of the whole electric energy storage device 21 can be improved when the current value of the input current $I_t$ repeatedly exhibits the peaks and valleys. Hereinafter, the aforementioned case is described in detail. In this embodiment, the chargeable electric energy of each of the electric double-layer capacitor unit 23 and the battery unit 24 indicates the maximum electric energy (electrical energy) which can be stored in and discharged from each, and is defined by a discharged electric energy based on a method of measuring a rated capacity of each device. For example, for the nickel-metal hydride battery, the chargeable electric energy is an electric energy obtained by performing a constant-current charge with the amount of electricity corresponding to 150% of a rated amount of electricity at 0.1 C (10-hour rate current) and then performing discharge to a predetermined voltage (generally, 1.0V to each cell) at 0.2 C (5-hour rate current). For the electric double-layer capacitor, the chargeable electric energy is an electric energy obtained by performing a constant-current/constant-voltage charge at 1.0 C (1-hour rate current) and a rated voltage and then performing a discharge to a predetermined voltage (generally, 0.0V to each cell) at 1.0 C.

In general, in the secondary battery or the electric double-layer capacitor, the chargeable electric energy and the internal resistance, which are indices of performance of the secondary battery or the electric double-layer capacitor, are not completely independent of each other. When one of the performances is improved, the other performance tends to be relatively lowered. Therefore, conventionally, for a purpose of use with a short period of time for one charge or discharge, it is considered to be important to decrease the internal resistance in view of the improvement of input/output performance of the electric energy storage device. On the other hand, for a purpose of use where the charge/discharge is performed over a relatively long period of time, short-term input/output performance is not considered to be extremely important. Therefore, the secondary battery having a high energy density is used, whereas the internal resistance is not considered to be much of a problem. On the other hand, when the electric power externally supplied with the input current $I_t$ having the current value repeatedly exhibiting the peaks and valleys in periodic is to be storaged, the charging efficiency is not always optimized even if the electric double-layer capacitor having a small internal resistance is connected simply at the expense of the chargeable electric energy.

In view of the aforementioned circumstances, a parameter P expressed by a product of the internal resistance ratio ($R_c/R_b$) and the chargeable electric energy ratio ($W_c/W_b$) is introduced below as a parameter in consideration of both the internal resistance and the accumulable electric energy of the electric double-layer capacitor unit 23 to be connected in parallel to the battery unit 24. Specifically, a value of the parameter P is a dimensionless amount calculated by:

$$P=(R_c \cdot W_c)/(R_b \cdot W_b).$$

When the electric energy storage device is charged with the momentarily input current, there is little necessity for the accumulable electric energy $W_c$ of the electric double-layer capacitor unit 23 to be large. On the other hand, the internal resistance $R_c$ is required to be small. Therefore, a value of the parameter P is desired to be smaller. In this embodiment, however, the charge is assumed to be performed with the input current $I_t$ having a time cycle of about five seconds to about five minutes for one continuous charge. In this case, the input current $I_t$ is distributed according to an inverse ratio of the internal resistance of the battery unit 24 and that of the electric double-layer capacitor unit 23 at the moment when the charge is started. Thereafter, however, the voltage of the electric double-layer capacitor unit 23 increases in proportion to the charged amount of electricity. Therefore, the distribution of the input current $I_t$ changes so that a difference in voltage between the electric double-layer capacitor unit 23 and the battery unit 24, which is caused by the increased voltage, is eliminated. Specifically, the current flowing into the battery unit 24 increases, whereas the current flowing into the electric double-layer capacitor unit 23 decreases. Here, if the chargeable electric energy $W_c$ of the electric double-layer capacitor unit 23 is small, the current flowing into the electric double-layer capacitor unit 23 decreases at a relatively early time, and hence, the current flowing into the battery unit 24 is increased. Therefore, the current flowing into the battery unit 24 cannot be sufficiently leveled. Therefore, it is necessary to determine the value of the parameter P in consideration of both the internal resistance ratio and the chargeable electric energy ratio so that the input current $I_t$ is distributed to be supplied to both the electric double-layer capacitor unit 23 and the battery unit 24 under desirable conditions according to the length of time for one continuous charge.

More specifically, it is preferred that the value of the parameter P fall in the range of 0.018 to 0.036, inclusively. Further, it is more preferred that the value of the parameter P be equal to or less than 0.030. It is further preferred that the value of the parameter P be equal to or larger than 0.025. Specifically, it is further preferred that the value of the parameter P be 0.025 or larger and 0.030 or smaller. By using the electric double-layer capacitor unit 23 and the battery unit 24 satisfying the aforementioned condition, the charging efficiency of the electric energy storage device 21 can be improved.

According to the embodiment described above, when the electric power externally supplied with the input current $I_t$ having the current value repeatedly exhibiting the peaks and valleys is to be storaged, the ratio of the internal resistance $R_c$ of the electric double-layer capacitor unit 23 to the internal resistance $R_b$ of the battery unit 24 or the value of the parameter P is appropriately determined. As a result, the charging efficiency of the electric energy storage device 21 can be improved.

In the above description, the pulse current having the square wave is assumed as the input current $I_t$. However, the input current $I_t$ obtained by, for example, the wind power generation is not always a current having two current values, $I_1$ and 0, as described above and is assumed to have the current value which exhibits peaks and valleys irregularly. In such a case, for example, values described below may be used as the aforementioned parameters $I_1$, t1, and t2 relating to the input current $I_r$. Specifically, over one set of the peak and valley of the current value of the input current $I_r$, the time period during which a current having a predetermined threshold value or larger flows is t1, whereas the time period during which a current less than the predetermined threshold value flows is t2. Further, in the case where the cycles of the peaks and valleys of the input current $I_r$ over the entire time period during which the electric energy storage device 21 is assumed to be charged are irregular, the time periods during which the current having the predetermined threshold value or larger flows and the time periods during which the current less than the predetermined threshold value flows are added over all the plurality of repeated peaks and valleys. The values obtained by the addition are respectively divided by the number of repeated sets of the peak and valley to calculate an average value of the time periods during which the current having the predetermined threshold value or larger flows and an average value of the time periods during which the current less than the predetermined threshold value flows over a single set of the peak and valley. The calculated average values may be used as the time parameters t1 and t2. An average value of the input current $I_r$ during the time periods t1 in which the current value of the input current $I_r$ exceeds the predetermined threshold value is used as $I_1$.

The aforementioned structures of the first embodiment and the second embodiment may be used in combination. Specifically, the battery units may be respectively connected in parallel to the plurality of electric double-layer capacitors connected in series to each other and each battery unit may have the overcharge voltage equal to or less than the rated voltage of the electric double-layer capacitor connected thereto. In addition, the set of the electric double-layer capacitor and the battery unit connected in parallel to each other may satisfy the condition of the parameter P as described above.

EXAMPLES

Hereinafter, specific examples of the electric energy storage device, to which the present invention is applied, are described as Examples. However, the present invention is not limited to the following Examples. First, as examples of the electric energy storage device in which the battery units, each including two nickel-metal hydride batteries, and the electric double-layer capacitor units are connected in parallel, Examples A1 and A2 are described.

Example A1

The battery unit including two D-size nickel-metal hydride batteries (GP1000DH manufactured by GP batteries International Limited) connected in series to each other, each having a rated capacity of 10,000 mAh, was connected in parallel to the electric double-layer capacitor unit including two "N's CAP"s (registered trademark) manufactured by Nisshinbo Holdings Inc., corresponding to the electric double-layer capacitors, connected in series to each other, each having a rated voltage of 3.2V or higher, to obtain the electric energy storage device. In this electric energy storage device, a ratio of the chargeable electric energy of the battery unit and that of the electric double-layer capacitor was 10:1, whereas the ratio ($R_c/R_b$) of the internal resistance $R_c$ of the electric double-layer capacitor and the internal resistance $R_b$ of the battery unit was 0.25.

Example A2

The battery unit including two D-size nickel-metal hydride batteries (GP1000DH manufactured by GP batteries International Limited) connected in series to each other, each having a rated capacity of 10,000 mAh, was connected in parallel to the electric double-layer capacitor unit including one "N's CAP" (registered trademark) manufactured by Nisshinbo Holdings Inc., corresponding to the electric double-layer capacitor having a rated voltage of 3.2V or higher, to obtain the electric energy storage device. In this electric energy storage device, a ratio of the storaged electric amount of the battery unit and that of the electric double-layer capacitor was 10:0.5, whereas the ratio ($R_c/R_b$) of the internal resistance $R_c$ of the electric double-layer capacitor and the internal resistance $R_b$ of the battery unit was 0.13.

Comparative Example a1

For comparison between the charging efficiency in the case where the electric double-layer capacitor is not connected in parallel to the battery unit and the charge efficiencies of Examples, a battery unit obtained by connecting the two D-size nickel-metal hydride batteries (GP1000DH manufactured by GP batteries International Limited), each having a rated capacity of 10,000 mAh, in series, was used alone to obtain the electric energy storage device.

[Measurement Results]

The charge efficiencies were measured when the following input currents in two patterns were input to each of the electric energy storage devices of Examples A1 and A2 and Comparative Example a1.

Pattern A: Repeats of input of a current having a current rate of 3.0 C for 10 seconds and rest for 11 seconds.
Pattern B: Repeats of input of a current having a current rate of 1.0 C for 10 seconds and rest for 11 seconds.

Figure 10:
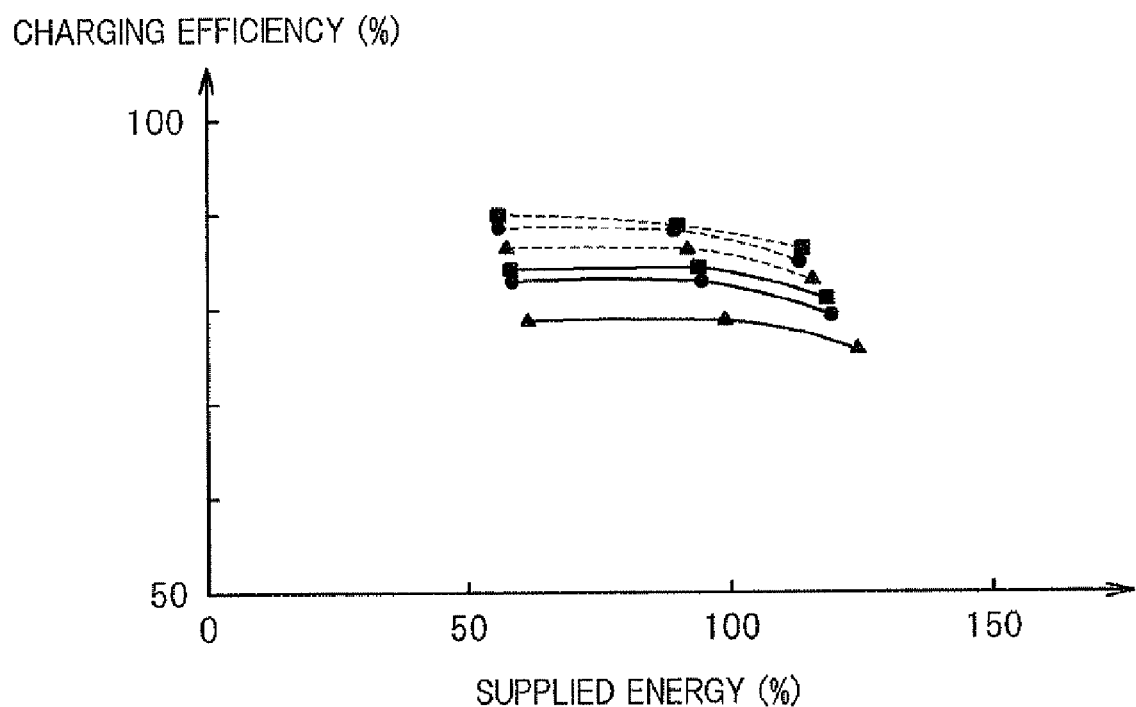
FIG. 10 is a graph showing measurement results for charging efficiency in Examples.
Figure 11:
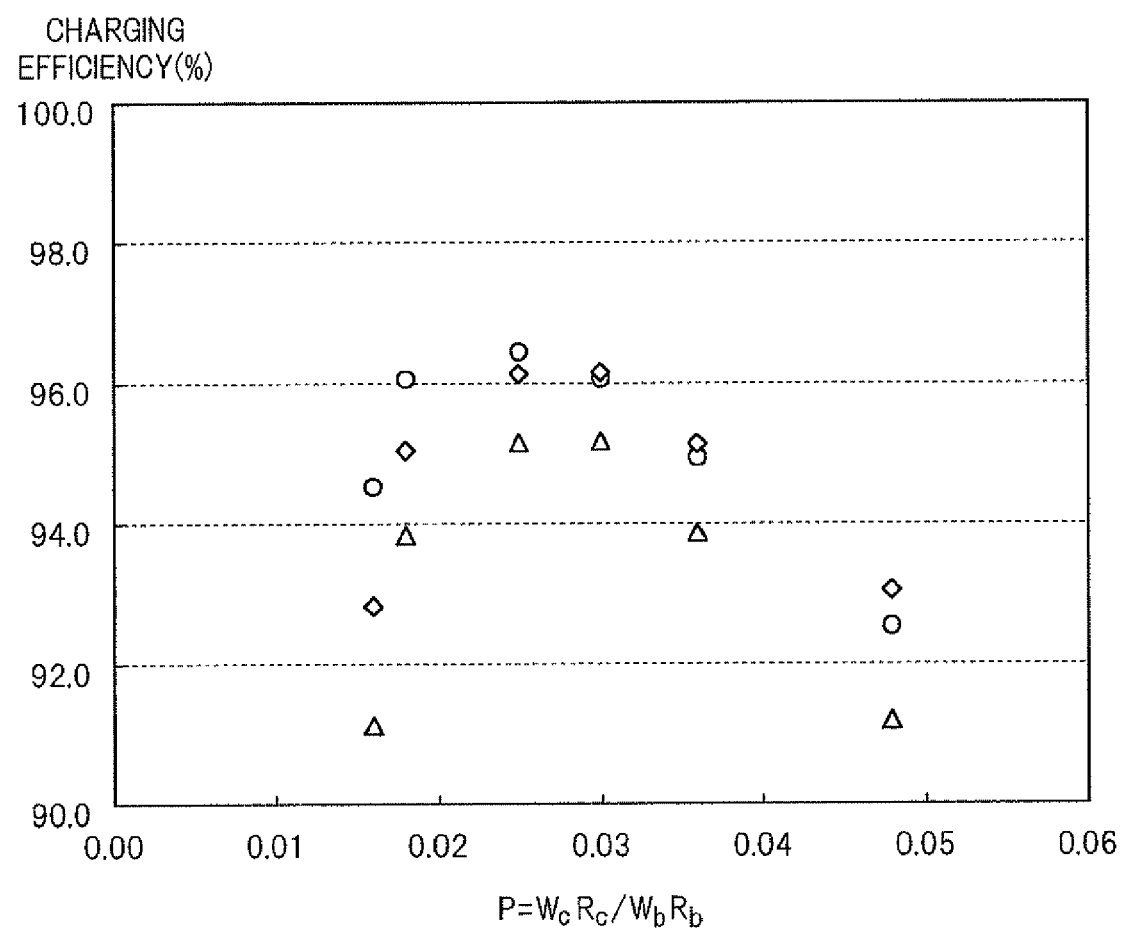
FIG. 11 is a graph showing other measurement results for charging efficiency in Examples.

The measurement results are shown in FIG. 10. In the graph, a horizontal axis indicates a ratio (in %) of the amount of externally supplied electric energy (supplied energy) (in J) to the electric energy chargeable in the electric energy storage device, whereas a vertical axis indicates the charging efficiency (a ratio of the energy stored in the electric energy storage device to the supplied energy) (in %). Moreover, solid lines indicate the measurement results for the input current in Pattern A, whereas broken lines indicate the measurement results for the input current in Pattern B. Further, lines plotted with rectangular signs indicate the measurement results of Example A1, lines plotted with circular signs indicate the measurement results of Example A2, and lines plotted with triangular signs indicate the measurement results of Comparative Example a1.

As shown in the graph, in each of Examples A1 and A2, the charging efficiency is improved for both the input currents in Pattern A and Pattern B compared with Comparative Example a1. Although the charging efficiency of Example A1 is improved more than that of Example A2, the degree of increase is larger for the input current in Pattern A than for the input current in Pattern B. Specifically, for the purpose of use where the input current modeled in Pattern A is assumed to be used, the increase in capacity of the electric double-layer capacitor more greatly improves the charging efficiency compared with the case with Pattern B.

Next, Examples for describing the relation between the value of the parameter P and the charging efficiency are described.

[Fabrication of a Nickel-Metal Hydride Battery Unit]

Ten cells of D-size cylindrical sealed nickel-metal hydride batteries (GP1000DH manufactured by GP batteries International Limited, each having a rated power of 10,000 mAh, a rated discharge voltage of 1.25V, an upper-limit charge voltage of 1.5V, and an internal resistance of 2.5 mΩ) were arranged so that two cells were arranged in a height direction and five cells were arranged in a vertical direction, and were connected in series by resistance welding nickel pieces, each having a width of 20 mm, a thickness of 0.3 mm, and a length of 40 mm, to the electrode terminals. In this manner, a nickel-metal hydride battery unit having a rated voltage of 12.5V and an upper-limit charge voltage of 15V (the chargeable electric energy $W_b$=125,000 mWh, and the internal resistance $R_b$=25 mΩ) was fabricated.

Example B1

Five electric double-layer capacitor cells, each having a rated electrostatic capacitance of 3,000 F, a rated voltage of 3.0V, and an internal resistance of 0.6 mΩ, were connected in series by welding the electrode terminals thereof to fabricate an electric double-layer capacitor unit having a rated voltage of 15V, an electrostatic capacitance of 600 F, and an internal resistance $R_c$ of 3 mΩ (the chargeable electric energy $W_c$=18,750 mWh). The electric double-layer capacitor unit was connected in parallel to the aforementioned nickel-metal hydride battery unit by using a vinyl-sheathed wire having a diameter of 5.5 mm and a length of 50 mm to obtain the electric energy storage device.

Example B2

Five electric double-layer capacitor cells, each having a rated electrostatic capacitance of 5,000 F, a rated voltage of 3.0V, and an internal resistance of 0.5 mΩ, were connected in series by welding the electrode terminals thereof to fabricate an electric double-layer capacitor unit having a rated voltage of 15V, an electrostatic capacitance of 1,000 F, and an internal resistance $R_c$ of 2.5 mΩ (the chargeable electric energy $W_c$=31,250 mWh). The electric double-layer capacitor unit was connected in parallel to the aforementioned battery unit by using a vinyl-sheathed wire having a diameter of 5.5 mm and a length of 50 mm to obtain the electric energy storage device.

Example B3

Five electric double-layer capacitor cells, each having a rated electrostatic capacitance of 6,000 F, a rated voltage of 3.0V, and an internal resistance of 0.5 mΩ, were connected in series by welding the electrode terminals thereof to fabricate an electric double-layer capacitor unit having a rated voltage of 15V, an electrostatic capacitance of 1,200 F, and an internal resistance $R_c$ of 2.5 mΩ (the chargeable electric energy $W_c$=37,500 mWh). The electric double-layer capacitor unit was connected in parallel to the aforementioned battery unit by using a vinyl-sheathed wire having a diameter of 5.5 mm and a length of 50 mm to obtain the electric energy storage device.

Example B4

Five electric double-layer capacitor cells, each having a rated electrostatic capacitance of 6,000 F, a rated voltage of 3.0V, and an internal resistance of 0.6 mΩ, were connected in series by welding the electrode terminals thereof to fabricate a electric double-layer capacitor unit having a rated voltage of 15V, an electrostatic capacitance of 1,200 F, and an internal resistance $R_c$ of 3 mΩ (the chargeable electric energy $W_c$=37,500 mWh). The electric double-layer capacitor unit was connected in parallel to the aforementioned battery unit by using a vinyl-sheathed wire having a diameter of 5.5 mm and a length of 50 mm to obtain the electric energy storage device.

Comparative Example b1

The battery unit alone was used to obtain the electric energy storage device.

Comparative Example b2

Five electric double-layer capacitor cells, each having a rated electrostatic capacitance of 1,000 F, a rated voltage of 3.0V, and an internal resistance of 1.2 mΩ, were connected in series by welding the electrode terminals thereof to fabricate an electric double-layer capacitor unit having a rated voltage of 15V, an electrostatic capacitance of 200 F, and an internal resistance $R_c$ of 6 mΩ (the chargeable electric energy $W_c$=6,250 mWh). The electric double-layer capacitor unit was connected in parallel to the aforementioned battery unit by using a vinyl-sheathed wire having a diameter of 5.5 mm and a length of 50 mm to obtain the electric energy storage device.

Comparative Example b3

Five electric double-layer capacitor cells, each having a rated electrostatic capacitance of 2,000 F, a rated voltage of 3.0V, and an internal resistance of 0.8 mΩ, were connected in series by welding the electrode terminals thereof to fabricate an electric double-layer capacitor unit having a rated voltage of 15V, an electrostatic capacitance of 400 F, and an internal resistance $R_c$ of 4 mΩ (the chargeable electric energy $W_c$=12,500 mWh). The electric double-layer capacitor unit was connected in parallel to the aforementioned nickel-metal hydride battery unit by using a vinyl-sheathed wire having a diameter of 5.5 mm and a length of 50 mm to obtain the electric energy storage device.

Comparative Example b4

Five electric double-layer capacitor cells, each having a rated electrostatic capacitance of 6,000 F, a rated voltage of 3.0V, and an internal resistance of 0.8 mΩ, were connected in series by welding the electrode terminals thereof to fabricate an electric double-layer capacitor unit having the rated voltage of 15V, an electrostatic capacitance of 1,200 F, and an internal resistance $R_c$ of 4 mΩ (the chargeable electric energy $W_c$=37,500 mWh). The electric double-layer capacitor unit was connected in parallel to the aforementioned nickel-metal hydride battery unit by using a vinyl-sheathed wire having a diameter of 5.5 mm and a length of 50 mm to obtain the electric energy storage device.

[Measurement Results]

For each of the electric energy storage devices of Examples B1 to B4 and Comparative Examples b1 to b4 described above, after discharging the remaining electric energy to 10V at a 5-hour rate current (2,000 mA) for the rated amount of electricity of the nickel-metal hydride battery, a cycle of charging the electric energy storage device with a current of 20 A for 10 seconds and subsequently resting for 10 seconds was repeated so as to charge the electric energy storage device with 80% (8,000 mAh) of the chargeable electric energy. The parameters relating to the input current at this time were: $I_1$=20 A, t1=10 seconds, and t2=10 seconds. After the charge, the electric energy was discharged again to 10V at the 5-hour rate current (2,000 mA) for the rated amount of electricity of the nickel-metal hydride battery. The voltage of the nickel-metal hydride battery was a voltage measured between the electrode terminals of the battery. The voltage of the electric energy storage device according to each of Examples was a voltage measured between copper wires, each exposed from a middle portion of the vinyl-sheathed wire used for connecting the positive/negative electrodes of the nickel-metal hydride battery unit and those of the electric double-layer capacitor unit. An integral of the amount of electricity at the voltage of the electric energy storage device when the electric energy storage device was charged was an electric energy $W_{charge}$ supplied to the electric energy storage device, an integral of the amount of electricity at the voltage of the electric energy storage device when the electric energy storage device was discharged was a discharged electric energy $W_{discharge}$. A ratio of the discharged electric energy to the charged electric energy, $W_{discharge}/W_{charge} \times 100(\%)$, was obtained as a charging efficiency $E_{ff}$ of the electric energy storage device under the charging conditions.

Moreover, the cases where measurements were performed under the charging conditions where a cycle of charging the electric energy storage device with the current of 20 A for 60 seconds and then resting for 60 seconds was repeated to charge the electric energy storage device with 80% (8,000 mAh) of the storaged amount of electricity, respectively for the electric energy storage devices described in Examples B1 to B4 and Comparative Examples b2 to b4, are described as Examples C1 to C4 and Comparative Examples c1 to c3. The parameters relating to the input current at this time were $I_1$=20 A, t1=60 seconds, and t2=60 seconds.

Further, the cases where measurements were performed under the charging conditions where a cycle of charging the electric energy storage device with the current of 20 A for 300 seconds and then resting for 300 seconds was repeated to charge the electric energy storage device with 80% (8,000 mAh) of the storaged amount of electricity, respectively for the aforementioned electric energy storage devices, are described as Examples D1 to D4 and Comparative Example d1 to d3. The parameters relating to the input current at this time were $I_1$=20 A, t1=300 seconds, and t2=300 seconds.

The internal resistance ratio ($R_c/R_b$), the chargeable electric energy ratio ($W_c/W_b$), the value of the parameter P, the conditions relating to the input current, and the result of simulation of the charging efficiency in the electric energy storage devices of Examples and Comparative Examples described above are shown in the following table.

TABLE 1

| | Chargeable electric energy ratio $W_c/W_b$ (J/J) | Internal resistance ratio $R_c/R_b$ (Ω/Ω) | Parameter P $W_c R_c/W_b R_b$ (JΩ/JΩ) | Input current value $I_1$ (A) | Charging time t1 (s) | Rest time t2 (s) | Efficiency of assembled battery $E_{ff}$ (%) |
|---|---|---|---|---|---|---|---|
| Comparative Example b1 | 0.00 | — | — | 20 | 10 | 10 | 80.0 |
| Comparative Example b2 | 0.05 | 0.24 | 0.012 | 20 | 10 | 10 | 91.1 |
| Comparative Example b3 | 0.10 | 0.16 | 0.016 | 20 | 10 | 10 | 94.6 |
| Example B1 | 0.15 | 0.12 | 0.018 | 20 | 10 | 10 | 96.1 |
| Example B2 | 0.25 | 0.10 | 0.025 | 20 | 10 | 10 | 96.5 |
| Example B3 | 0.30 | 0.10 | 0.030 | 20 | 10 | 10 | 96.1 |
| Example B4 | 0.30 | 0.12 | 0.036 | 20 | 10 | 10 | 95.0 |
| Comparative Example b4 | 0.30 | 0.16 | 0.048 | 20 | 10 | 10 | 92.6 |
| Comparative Example c1 | 0.05 | 0.24 | 0.012 | 20 | 60 | 60 | 88.4 |
| Comparative Example c2 | 0.10 | 0.16 | 0.016 | 20 | 60 | 60 | 92.9 |
| Example C1 | 0.15 | 0.12 | 0.018 | 20 | 60 | 60 | 95.1 |
| Example C2 | 0.25 | 0.10 | 0.025 | 20 | 60 | 60 | 96.2 |
| Example C3 | 0.30 | 0.10 | 0.030 | 20 | 60 | 60 | 96.2 |
| Example C4 | 0.30 | 0.12 | 0.036 | 20 | 60 | 60 | 95.2 |
| Comparative Example c3 | 0.30 | 0.16 | 0.048 | 20 | 60 | 60 | 93.1 |
| Comparative Example d1 | 0.05 | 0.24 | 0.012 | 20 | 300 | 300 | 86.0 |
| Comparative Example d2 | 0.10 | 0.16 | 0.016 | 20 | 300 | 300 | 91.2 |
| Example D1 | 0.15 | 0.12 | 0.018 | 20 | 300 | 300 | 93.9 |
| Example D2 | 0.25 | 0.10 | 0.025 | 20 | 300 | 300 | 95.2 |
| Example D3 | 0.30 | 0.10 | 0.030 | 20 | 300 | 300 | 95.2 |
| Example D4 | 0.30 | 0.12 | 0.036 | 20 | 300 | 300 | 93.9 |
| Comparative Example d3 | 0.30 | 0.16 | 0.048 | 20 | 300 | 300 | 91.2 |

FIG. $1_1$ is a graph showing the relation between the value of the parameter P and the charging efficiency $E_{ff}$ shown in the aforementioned table. In FIG. $1_1$, a horizontal axis indicates the value of the parameter P, whereas a vertical axis indicates the value of the charging efficiency $E_{ff}$. Each circular sign indicates the case where t1=t2=10 seconds (Examples B1 to B4 and Comparative Examples b2 to b4), each rectangular sign indicates the case where t1=t2=60 seconds (Examples C1 to C4 and Comparative Examples c1 to c3), and each triangular sign indicates the case where t1=t2=300 seconds (Examples D1 to D4 and Comparative Examples d1 to d3).

As is apparent from FIG. $1_1$, in the case of the cycle of supplying the electric energy storage devices with the electric power at time intervals with the time period t1=10 to 300 seconds and then stopping the input current, it is understood that the charging efficiency $E_{ff}$ is more improved for the electric energy storage devices with the value of the parameter P being equal to or larger than 0.018 and equal to or less than 0.036 than for the electric energy storage devices with the value of the parameter P being less than 0.018 or larger than 0.036. Moreover, the charging efficiency $E_{ff}$ has a peak when the value of the parameter P is in the vicinity of 0.025 to 0.030 and then decreases. Therefore, by determining the types and configurations of the electric double-layer capacitor unit and the battery unit so that the value of the parameter P becomes 0.018 or larger and 0.036 or less, more preferably, from 0.025 to 0.030, the charging efficiency $E_{ff}$ can be improved for the purpose of use where the current value of the input current repeatedly exhibits the peaks and valleys.

The invention claimed is:

1. An electric energy storage device charged with an input current having a current value repeatedly exhibiting peaks and valleys, comprising:
   an electric double-layer capacitor unit including at least one electric double-layer capacitor; and
   a battery unit including at least one secondary battery, the battery unit being connected in parallel to the electric double-layer capacitor unit,
   wherein a ratio of an internal resistance of the electric double-layer capacitor unit to an internal resistance of the battery unit is determined according to parameters relating to the input current;
   the parameters relating to the input current include a parameter relating to a change in the input current with time.

2. The electric energy storage device according to claim 1, wherein the parameter relating to the change in the input current with time includes a time period during which a current having a predetermined threshold value or larger flows over one cycle including the peak and the valley of the current value.

3. The electric energy storage device according to claim 1, wherein the parameter relating to the change in the input current with time includes a time period during which a current less than a predetermined threshold value flows over one cycle including the peak and the valley of the current value.

4. The electric energy storage device according to claim 1, wherein the ratio of the internal resistances is determined so that a value of a product of the ratio of the internal resistances and a ratio of a chargeable electric energy of the electric double-layer capacitor unit to a chargeable electric energy of the battery unit is to be a value according to the parameters relating to the input current.

5. The electric energy storage device according to claim 4, wherein the value of the product is equal to or larger than 0.018 and equal to or smaller than 0.036.

6. The electric energy storage device according to claim 5, wherein the value of the product is equal to or larger than 0.025 and equal to or smaller than 0.030.

7. An electric energy storage device charged with an input current having a current value repeatedly exhibiting peaks and valleys, comprising:
   an electric double-layer capacitor unit including at least one electric double-layer capacitor; and
   a battery unit including at least one secondary battery, the battery unit being connected in parallel to the electric double-layer capacitor unit,
   wherein a value of a product of a ratio of an internal resistance of the electric double-layer capacitor unit to an internal resistance of the battery unit and a ratio of a chargeable electric energy of the electric double-layer capacitor unit to a chargeable electric energy of the battery unit is equal to or larger than 0.018 and equal to or smaller than 0.036.

8. The electric energy storage device according to claim 7, wherein the value of the product is equal to or larger than 0.025 and equal to or smaller than 0.030.

9. An electric energy storage device, comprising:
   a plurality of electric double-layer capacitors connected in series to each other; and
   a plurality of battery units respectively connected in parallel to the plurality of electric double-layer capacitors, each of the plurality of battery units including at least one sealed secondary battery for reducing oxygen, generated at a positive electrode, at a negative electrode when the at least one sealed secondary battery is overcharged,
   wherein a rated voltage of each of the plurality of electric double-layer capacitors is equal to or higher than a voltage obtained when a corresponding one of the plurality of battery units, which is connected in parallel to the each electric double-layer capacitor, is overcharged.

10. The electric energy storage device according to claim 9, wherein each of the battery units is constituted by connecting a plurality of the secondary batteries in series.

11. The electric energy storage device according to claim 9, wherein the secondary battery comprises any one of a nickel-metal hydride battery, a nickel-cadmium battery, and a valve-regulated lead-acid battery.

12. The electric energy storage device according to claim 1, wherein the ratio of the internal resistances is determined so that a value of a product of the ratio of the internal resistances and a ratio of a chargeable electric energy of the electric double-layer capacitor unit to a chargeable electric energy of the battery unit is to be a value according to the parameters relating to the input current.

13. The electric energy storage device according to claim 2, wherein the ratio of the internal resistances is determined so that a value of a product of the ratio of the internal resistances and a ratio of a chargeable electric energy of the electric double-layer capacitor unit to a chargeable electric energy of the battery unit is to be a value according to the parameters relating to the input current.

14. The electric energy storage device according to claim 3, wherein the ratio of the internal resistances is determined so that a value of a product of the ratio of the internal resistances and a ratio of a chargeable electric energy of the electric double-layer capacitor unit to a chargeable electric energy of the battery unit is to be a value according to the parameters relating to the input current.

* * * * *